United States Patent [19]

Fry

[11] 3,972,977

[45] Aug. 3, 1976

[54] MOULDING PROCESS FOR UNSATURATED POLYESTER RESINS CONTAINING FILLER MATERIAL

[75] Inventor: David Philip Fry, Llanishen, Wales

[73] Assignee: BP Chemicals International Limited, England

[22] Filed: Apr. 5, 1972

[21] Appl. No.: 241,375

[30] Foreign Application Priority Data

| Apr. 6, 1971 | United Kingdom................. 8885/71 |
| Oct. 25, 1971 | United Kingdom............... 49425/71 |
| Feb. 2, 1972 | United Kingdom................. 4886/72 |

[52] U.S. Cl.............................. 264/331; 260/862; 264/161; 264/276
[51] Int. Cl.² ........................ B29G 1/00; B29G 7/00
[58] Field of Search.................... 264/331, 276, 161; 260/862; 425/420, 812

[56] References Cited

UNITED STATES PATENTS

| 3,431,331 | 3/1969 | Pincus et al. ....................... 425/812 |
| 3,551,378 | 12/1970 | Rabenold et al..................... 260/862 |
| 3,652,489 | 3/1972 | Crowe et al. ........................ 260/862 |
| 3,701,748 | 10/1972 | Kroekel .............................. 264/331 |
| 3,721,642 | 3/1973 | Schalin et al. ..................... 260/862 |

Primary Examiner—Jeffery R. Thurlow

[57] ABSTRACT

A process for the preparation of moulded articles by the compression moulding at elevated temperatures in matched metal moulds of moulding compounds based on thermosettable unsaturated polyester resins, where at least one of the filler materials in the moulding compounds has a particle diameter greater than the width of flash channel of the mould used in order to enable moulded articles of improved surface finish to be produced.

17 Claims, No Drawings

MOULDING PROCESS FOR UNSATURATED POLYESTER RESINS CONTAINING FILLER MATERIAL

The present invention relates to thermosetting unsaturated polyester moulding compositions and to a process for the manufacture of moulded products from such compositions.

By a thermosetting moulding composition is meant throughout this specification a composition containing as an essential component an unsaturated polyester, which composition is normally fabricated into hard infusible shaped articles by the action of heat and pressure, for example by matched metal moulding in a heated mould.

Examples of such thermosetting moulding compositions are dough moulding compounds (DMC), preimpregnated mats (otherwise known as sheet moulding compositions, SMC) or other forms of reinforcement in preimpregnated form which usually contain a fibrous reinforcing filler and an inert mineral filler to give the moulding composition the required consistency, matched die compositions based on unsaturated polyester and reinforcement mat or "preform", i.e. preformed moulding compositions. The present invention as described hereafter is particularly useful with respect to DMC, but it not limited to use therein.

Hitherto matched metal hot press mouldings produced from unsaturated polyester resin compositions have the disadvantage that the surface exhibits porosity which gives rise to unacceptable blemishes in the paint film when the mouldings are subsequently painted. This porosity is both visible (macro) and invisible (micro) to the naked eye, and consequently it is not possible to determine whether a given moulding is acceptable until it is painted. It is believed that the porosity is caused by air entrained in the moulding composition during its manufacture and which is not fully driven out during the moulding process. Whilst it is possible to reduce such porosity by using a matched metal mould having a small flash channel, i.e. the gap between the two parts of the tool when the mould is closed, by careful placement of the charge in the mould and by control of the closing speed of the mould, porosity is not always sufficiently eliminated.

Accordingly the present invention is a process for the preparation of a moulded article which comprises moulding under the action of heat and pressure in a matched metal mould a composition comprising an unsaturated polyester, an ethylenically unsaturated monomer copolymerisable therewith, a fibrous reinforcing filler and a primary particulate inorganic filler of particle diameter greater than the width of the flash channel of the mould.

The preferred unsaturated polyesters for use in the composition of the present invention are those which have a relatively high hot rigidity in the thermoset state, so that any reduction of rigidity due to the presence of modifying agents is offset. Examples of such unsaturated polyesters are these which have a high proportion of maleic or fumaric unsaturation for example polypropylene glycol maleate, or such unsaturated polyesters with a minor proportion of the maleic or fumaric residues replaced by isophthalic or carbic acid residues. Also suitable are unsaturated polyesters containing a high proportion of maleic and fumaric residues and the Bisphenol A adducts of ethylene oxide or propylene oxide. Further suitably unsaturated polyesters are those in which a minor proportion of the maleic or fumaric residues are replaced by chloro-acid residues such as tetrachlorophthalic or chlorendic acid residues.

The copolymerisable monomer is suitably a liquid monomer having $\alpha, \beta$-ethylenic unsaturation for example styrene, diallyl phthalate, and vinyl toluene. The unsaturated polyester is usually dissolved in the copolymerisable monomer. A solid copolymerisable monomer such as triallyl cyanurate can also be used. The amount of copolymerisable monomer used is suitably in the range from 10 to 60% by weight and preferably from 20 to 50% by weight based on the total weight of the unsaturated polyester and copolymerisable monomer.

The unsaturated polyester and the copolymerisable monomer are suitably present in an amount in the range 15 to 40% and preferably 20 to 35% by weight of the total moulding composition.

The fibrous reinforcing filler can be any of the fillers well known in the art for use in unsaturated polyester based moulding compositions. Examples include glass fibres, preferably surface treated to improve adhesion, carbon fibres, mineral fibres such as asbestos, natural fibres such as sisal and synthetic fibres such as terylene and polyvinyl alcohol. The amount of fibrous reinforcement used will depend on the desired strength of the resulting moulding. In general it is found suitable to use a quantity of fibrous material in the range from 15 to 35% by weight of the total composition. The fibres are suitably either in the form of a mat or web, or alternatively in the form of chopped strands or rovings.

The primary particulate inorganic filler of particle diameter greater than the width of the flash channel of the mould can be of any suitable shape, i.e. spherical, cubic rectangular or irregular. In practice it has been found that the average width of the flash channels on matched metal moulds is of the order of 3 to $5 \times 10^{-3}$ inches, and therefore the diameter of the primary filler particles used should preferably be greater than $5 \times 10^{-3}$ inches, although primary fillers of diameter greater than $3 \times 10^{-3}$ inches can be used, provided that the diameter is greater than the width of the flash channel. The quantity of the said primary particulate inorganic filler used governs the degree of improvement of the surface porosity obtained. In general, amounts less than 6.0% by weight of the total composition do not give elimination of porosity. It is preferred to use from 10 to 20% by weight of the total composition, although larger quantities can be used.

It is preferred that the shape of the primary filler is such that its surface is substantially smooth, by which is meant that the surface is sufficiently smooth and free from sharp edges to prevent undue degradation of the fibrous reinforcing filler during mixing and moulding and undue scoring of the mould during moulding.

The said primary particulate fillers suitable for use in the present invention can be any of the filler materials known for use in unsaturated polyester resin based moulding compositions. Examples of suitable primary fillers include glass, alumina, silicates, calcium carbonate and dolomite and mixtures thereof. Particularly preferred primary fillers include substantially spherical glass beads, particularly the glass beads known as Ballotini 1221 (Ballotini is a registered trade mark) which have diameters in the range 33 to $7 \times 10^{-3}$ inches, and cubic or rectangular glass beads, particularly the glass beads known as Potters Bros. Glass Granules of particle diameter 50 to 3 × 10⁻³ inches. Such glass beads can be treated in the manner known for glass fibres for use in unsaturated polyester resin moulding compositions i.e. by treatment with a silane.

Secondary particulate inorganic fillers, of particle diameters which are smaller than the flash channel of the mould can also be present in quantities up to 50% by weight of the total composition. These secondary particulate fillers can be any of the filler materials known for use in unsaturated polyester resin based moulding compositions. Other active filler materials, such as fire retarding agents, e.g. antimony oxide and viscosity modifiers, e.g. calcium and magnesium oxides and hydroxides can also be present.

The moulding compositions suitably further contain a polymerisation inhibitor to prevent the premature polymerisation of the system on storage and a polymerisation initiator to initiate at elevated temperatures the polymerisation of the moulding compounds prepared for use in the moulding process of the present invention; examples of such initiators are the well known peroxidic materials such as dibenzoyl peroxide, tertiary butyl peroxide and tertiary butyl perbenzoate. Lubricants and mould release agents can also be present in the compositions in minor quantities.

In a preferred aspect of the present invention, a part of the secondary inorganic filler is replaced by a modifier system to control the mould shrinkage. Such modifiers are known for use in thermosetting unsaturated polyester resin moulding compositions. By way of example, thermoplastic polymers, i.e. polystyrene, polyethylene, polyvinyl chloride and polyacrylate and polymethacrylates etc., when added to the compositions in an amount up to about 15% by weight of the total composition greatly reduce the mould shrinkage, and such compositions are known as "low shrink" compositions. In a particularly preferred aspect of the present invention the modifier system comprises a combination of a saturated liquid polyester to prevent shrinkage and a thermoplastic polymer to prevent exudation of the saturated liquid polyester on moulding. Such a system enables mouldings having zero mould shrinkage or even an expansion to be obtained and such compositions are known as "non-srhink" compositions. They are described in our copening application Ser. No. 790,176,, now U.S. Pat. No. 3,642,683. Suitable saturated liquid polyesters for use in such systems include polypropylene adipate and polypropylene sebacate used at concentrations in the range 1 to 20% by weight and preferably 3 to 10% by weight on the total composition and suitable thermoplastics include polyvinyl chloride, polyethylene and polystyrene used in an amount sufficient to prevent exudation of the saturated liquid polyester, suitable quantities being in the range 5 to 45% by weight and preferably 20 to 30% by weight of the quantity of saturated liquid polyester, although larger quantities can be used without deleterious effect.

The process of the present invention is suitably carried out using a moulding pressure of the order of 500 to 800 p.s.i. and mould temperature of the order 120°C to 140°C these values being variable outside these limits depending on the exact nautre of the moulding compound used and the shape of the mould.

The process of the present invention will be further illustrated with reference to the following examples.

EXAMPLE 1

A polyester resin soup was prepared from the following components:

| | |
|---|---|
| Isophthalic acid based unsaturated polyester resin (60% soln in styrene) | 66.7 p.b.w. |
| Polypropylene adipate (Hexaplas PPA) | 14.4 p.b.w. |
| Styrene monomer | 6.5 p.b.w. |
| Polyvinyl chloride (Breon P 130/1) | 5.0 p.b.w. |
| Zinc stearate | 6.5 p.b.w. |
| Stearine | 0.7 p.b.w. |
| Butylated hydroxy toluene | 0.2 p.b.w. |
| | 100.0 p.b.w. |

A moulding composition was prepared from this soup together with the following constituents in a Winkworth mixer.

| | |
|---|---|
| Polyester resin soup | 30.0 p.b.w. |
| Benzoyl peroxide paste | 1.0 p.b.w. |
| Glass fibres (chopped strands ¼" length) | 15.0 p.b.w. |
| Spanish Dolomite, Substantially spherical particles of particle diameter 1000 microns (primary filler) | 10.0 p.b.w. |
| Finely divided calcium carbonate (secondary filler) | 44.0 p.b.w. |
| | 100.0 p.b.w. |

The composition was used to prepare a tray 18 inches by 15 inches by moulding in a matched metal mould having a flash channel width of 5 × 10⁻³ inches at 100 tons pressure and 130°C. The resultant mouldings were free from macro-porosity and the micro-porosity was greatly reduced without the need for consolidation of the material in an extruder to remove air entrained during the mixing. A further advantage was that the flash could be broken cleanly along the edge of the moulding.

EXAMPLE 2

A polyester resin soup was prepared from the following components:

| | |
|---|---|
| Isophthalic acid based unsaturated polyester resin (60% soln) | 66.7 p.b.w. |
| Polypropylene adipate (Hexaplas PPA) | 14.4 p.b.w. |
| Styrene monomer | 6.5 p.b.w. |
| Polyvinyl chloride (Breon P 130/1) | 5.0 p.b.w. |
| Zinc stearate | 6.5 p.b.w. |
| Stearine | 0.7 p.b.w. |
| Butylated hydroxy toluene | 0.2 p.b.w. |
| | 100.0 p.b.w. |

A moulding composition was prepared from this soup together with the following constituents in a Winkworth mixer.

| | |
|---|---|
| Polyester resin soup | 30.0 p.b.w. |
| Benzoyl peroxide paste | 1.0 p.b.w. |
| Glass fibres (chopped strands ¼" length) | 15.0 p.b.w. |
| Cubic/Rectangular glass granules of particle diameter in the range 50 to 3 × 10⁻³ inches ex. Potters Bros. Inc. New Jersey U.S.A. (primary filler) | 10.0 p.b.w. |
| Finely divided calcium carbonate (secondary filler) | 44.0 p.b.w. |
| | 100.0 p.b.w. |

The composition was used to prepare a tray 18 inches by 15 inches by moulding in a matched metal mould having a flash channel width of 5 × 10⁻³ inches at 100 tons pressure and 130°C. The resultant mouldings were free from macro-porosity and the micro-porosity was greatly reduced without the need for consolidation of the material in an extruder to remove air entrained during the mixing. A further advantage was that the flash could be broken cleanly along the edge of the moulding.

EXAMPLE 3

A polyester resin soup was prepared from the following components:

| | |
|---|---|
| Isophthalic acid based unsaturated polyester resin, 60% soln. in styrene | 66.7 p.b.w. |
| Polypropylene adipate (Hexaplas PPA) | 14.4 p.b.w. |
| Styrene monomer | 6.5 p.b.w. |
| PVC (Breon P 130/1) | 5.0 p.b.w. |
| Zinc stearate | 6.5 p.b.w. |
| Stearine | 0.7 p.b.w. |
| BHT | 0.2 p.b.w. |
| | 100.0 p.b.w. |

A moulding composition was prepared from this soup together with the following constituents in a Winkworth mixer.

| | |
|---|---|
| Polyester resin soup | 30 p.b.w. |
| Benzoyl peroxide paste | 1.0 p.b.w. |
| Glass fibres (chopped strands ¼" length) | 15.0 p.b.w. |
| Spherical glass beads (Ballotini 1221, having particle diameters in the range 33 to 7 × 10$^{-3}$ inches) (primary filler) | 10 p.b.w. |
| Finely divided calcium carbonate (secondary filler) | 44.0 p.b.w. |
| | 100.0 p.b.w. |

The composition was used to prepare a tray 18 inches by 15 inches by moulding in a matched metal mould having a flash channel width of $5 \times 10^{-3}$ inches at 100 tons pressure and 130°C. The resultant mouldings were free from macro-porosity and the micro-porosity was greatly reduced, without the need for consolidation of the material in an extruder to remove air entrained during the mixing.

I claim:

1. In a process for the preparation of a moulded article by subjecting a moulding composition to the action of heat and pressure in a matched metal mould having a flash channel, the improvement which consists of the use as the moulding composition of a material comprising an unsaturated polyester, an ethylenically unsaturated monomer copolymerisable therewith, a fibrous reinforcing filler and a primary particulate inorganic filler of particle diameter greater than the width of the flash channel of the mould, said primary particulate inorganic filler being present in an amount greater than 6.0% by weight of the total moulding composition and sufficient to improve the surface finish of the moulded article.

2. A process as claimed in claim 1 wherein the unsaturated polyester has a major proportion of maleic or fumaric unsaturation.

3. A process as claimed in claim 1 wherein a minor proportion of the maleic or fumaric residues in the unsaturated polyester are replaced by isophthalic, carbic, tetrachlorophthalic or chlorendic acid residues.

4. A process as claimed in claim 1 wherein the copolymerisable monomer is styrene, diallyl phthalate, vinyl toluene or triallyl cyanurate.

5. A process as claimed in claim 4 wherein the copolymerisable monomer is present in an amount in the range 10 to 60% by weight of the total weight of unsaturated polyester and copolymerisable monomer.

6. A process as claimed in claim 1 wherein the unsaturated polyester and the copolymerisable monomer are present in an amount in the range 20 to 35% by weight of the total moulding composition.

7. A process as claimed in claim 1 wherein the fibrous reinforcing filler is glass, sisal, asbestos, terylene and polyvinyl alcohol fibres.

8. A process as claimed in claim 7 wherein the fibrous reinforcing filler is present in an amount from 15 to 35% by weight of the total moulding composition.

9. A process as claimed in claim 1 wherein the primary particulate filler is glass, alumina, a silicate calcium carbonate, dolomite or mixtures thereof.

10. A process as claimed in claim 9 wherein the primary particulate filler comprises substantially spherical glass beads.

11. A process as claimed in claim 9 wherein the primary particulate filler comprises a cubic or rectangular glass beads.

12. A process as claimed in claim 1 wherein the diameter of the primary particulate filler is greater than $5 \times 10^{-3}$ inches.

13. A process as claimed in claim 1 wherein the primary particulate filler is present in an amount in the range 10 to 20% by weight of the total composition.

14. A process as claimed in claim 1 wherein the moulding composition contains up to 50% by weight of a secondary particulate inorganic filler.

15. A process as claimed in claim 14 wherein part of the secondary inorganic filler is replaced by an organic mould shrinkage control system.

16. A process as claimed in claim 1 wherein the moulding is carried out at pressures in the range 500 to 800 pounds per square inch and mould temperatures in the range 120° to 140°C.

17. A process as claimed in claim 1 wherein the matched metal mould used has a flash channel whose width is in the range 3 to $5 \times 10^{-3}$ inches.

* * * * *